May 13, 1958    M. E. QUYLE    2,834,141
FISHING LURE
Filed Feb. 16, 1956
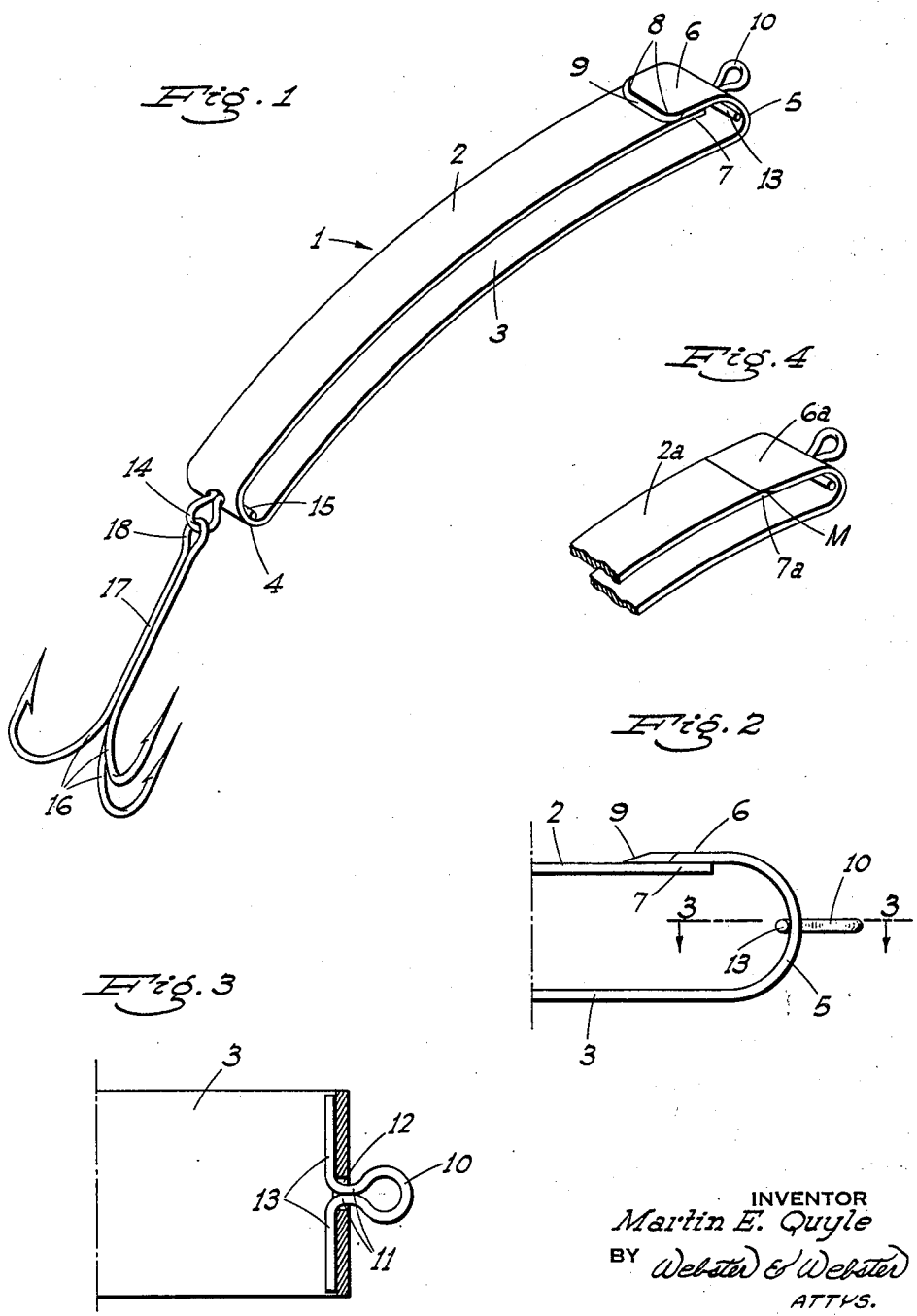
INVENTOR
Martin E. Quyle
BY Webster & Webster
ATTYS.

2,834,141
Patented May 13, 1958

1

2,834,141

FISHING LURE

Martin E. Quyle, Stockton, Calif.

Application February 16, 1956, Serial No. 565,825

2 Claims. (Cl. 43—42.06)

This invention is directed to, and it is a major object to provide, a novel fishing lure of the type adapted to be trolled or recurringly cast and retrieved when in use; the lure having a very effective side to side wobbling action in the water, and which action simulates the motion of a small fish, whereby to cause a sport fish to strike the lure.

Another important object of the present invention is to provide a fishing lure which embodies a novel, elongated body including a pair of longitudinally extending, flat metallic strips having matching end to end lengthwise curvature and disposed in spaced parallel relation; the body—which is made from a single length of metal—being closed at the ends of the strips and fitted at each end with an eye, one at the front for connection to a leader or line, and one at the rear for connection with a hook.

A further object of the invention is to provide a fishing lure, as above, wherein the body is formed—particularly at the front end and which is closed in a novel manner—so that it does not tend to snag on weeds, twigs, or the like which may be encountered when passing through the water, nor catch on the leader or line should the same turn over said body at any time.

A further object of the invention is to provide a fishing lure which is strong and durable, and is not readily permanently bent out of shape even though it forcefully engages under-water objects, or is subjected to rough usage or a heavy strike from a sport fish.

It is also an object of the invention to provide a fishing lure which is designed for ease and economy of manufacture.

Still another object of the invention is to provide a practical and reliable fishing lure, and one which will be exceedingly effective for the purpose for which it is designed.

These objects are accomplished by means of such structure and relative arrangement of parts as will fully appear by a perusal of the following specification and claims.

In the drawings:

Fig. 1 is a perspective view of the fishing lure.

Fig. 2 is an enlarged fragmentary side elevation of the front portion of the lure.

Fig. 3 is a fragmentary sectional plan view taken on line 3—3 of Fig. 2.

Fig. 4 is a fragmentary perspective view showing a modification.

Referring now more particularly to the drawings, and to the characters of reference marked thereon, the numeral 1 indicates generally the body of the lure, which body comprises a pair of elongated, relatively narrow but flat metallic strips, indicated at 2 and 3.

The strips 2 and 3 have a matching end to end lengthwise curvature and are disposed in spaced apart parallel relation; the spacing between the strips 2 and 3 being somewhat less than the side to side width of said strips.

The body 1—which is formed from a single length of metal, preferably spring brass—includes, in addition to the strips 2 and 3, a rounded or substantially half-circle bend 4 at the rear end, and which bend connects the adjacent ends of strips 2 and 3 in integral relation.

At the front end the body likewise includes a rounded or substantially half-circle bend 5, but here such bend is integral only with the strip 3, and opposite the latter is formed a rearwardly projecting lip 6.

The rearwardly projecting lip 6 is relatively short in its longitudinal projection, but is of sufficient extent to lap the front end portion 7 of the strip 2. The rear bend is shaped so that the strip 2 tends to spring away from the strip 3, but this is prevented—and said strip is maintained in parallelism with the strip 3—by the engagement of the front end portion 7 of said strip 3 beneath the rearwardly projecting lip 6.

The rear edge of the lip 6 is rounded at the corners, as at 8; such rear edge—including said corners—being chamfered or beveled for its full length, as at 9.

The advantage of having the front end portion 7 of strip 2 engaged beneath the lip 6 is that it eliminates the need of welding or otherwise securing the parts together, and additionally the strip 2 can spring downward toward the strip 3 under the force of a sport fish striking and grabbing the lure from the rear, and whereby the body 1 then slips easier in the mouth of the fish for the purpose of setting the hook, which is attached as hereinafter described.

The lure body 1 is adapted, at the front end, for attachment to a line or leader (not shown) by means of an eye 10 disposed centrally ahead of the front bend 5. The eye 10 includes relatively short, parallel, side by side shanks 11 which project through a central hole in the front bend 5; such shanks immediately inwardly of such hole 12 merging with opposed, laterally projecting legs 13 which lie in abutment against the inside of said front bend 5.

A similar eye 14 is disposed centrally behind the rear bend 4, and is attached to the latter in exactly the same way as the eye 10 is attached to the front bend 5, including opposed laterally extending legs, one of which is indicated at 15.

A hook 16 (here of treble type) trails the body 1, with the hook shank 17 projecting forwardly. An eye 18 on the front end of the hook shank 17 is engaged through the eye 14, whereby the hook 16 is connected to the body 1 in swingable or swivel relation.

In use of the above described fishing lure, the line or leader is connected to the eye 10, and thereafter when the lure is drawn through the water it has a very effective and attractive lateral wobbling action, but does not rotate about its longitudinal axis. Such wobbling action is caused by reason of the curvature of the strips 2 and 3, with the water impinging on the curved surfaces.

In order to increase the attractiveness of the lure, the outside surfaces of the strips 2 and 3 are preferably shiny-plated, as by chrome, while the inside or adjacent surfaces of said strips are painted at brilliant color, such as red. As the lure wobbles, the shiny outside surfaces reflect the light, while the brilliant color of the inside surfaces tends to produce a representation similar to the side coloring of a small fish.

The chamfered or beveled rear edge 9 of the rearwardly projecting lip 6 is of advantage in that it assures that the line or leader—if it ever drags across such portion of the lure, as when casting—is deflected away therefrom, and does not tend to engage between said lip 6 and the front end portion 7 of the strip 2.

In Fig. 4 there is illustrated a modification of the lapping arrangement between the rearwardly projecting lip and the front end portion of the adjacent strip. Here the lip 6a and the front end portion 7a of the strip 2a are normally disposed in longitudinal alinement, with miter-cut ends which engage in lapping relation, as at M.

More specifically, the rear end of lip 6a is beveled to face inwardly, and matchingly engages the adjacent end of portion 7a which is beveled to face outwardly. The function of this type of lapping arrangement is substantially the same as in the embodiment of Fig. 1, but with the advantage of a smooth longitudinal surface being presented, and additionally there is some reduction in weight at the front end of the lure.

From the foregoing description it will be readily seen that there has been produced such a device as will substantially fulfill the objects of the invention, as set forth herein.

While this specification sets forth in detail the present and preferred construction of the device, still in practice such deviations therefrom may be resorted to as do not form a departure from the spirit of the invention, as set forth herein.

Having thus described the invention, the following is claimed as new and useful, and upon which Letters Patent are desired:

1. A fishing lure comprising an elongated body adapted at the rear for attachment to a hook and at the front for connection to a line, said body being formed of a single length of unbroken-surface resilient strip material arranged in the form of a pair of longitudinal strips having matching lengthwise curvature in a continuous direction and disposed in spaced parallel relation, one integral bend connecting the strips at the rear of the body, another integral bend connected at one end to one strip at the front of the body and extending toward the other strip, and a lip projecting rearwardly from the other end of said other integral bend and lapping the front end of the other strip on the outside in disconnected yieldable relation and parallel thereto; both of said bends being substantially semi-circular in form and merging directly into the adjacent ends of the strips and lip.

2. A lure, as in claim 1, in which the strips are shiny-plated on their opposite faces and brilliantly colored on their adjacent faces.

References Cited in the file of this patent
UNITED STATES PATENTS

| | | |
|---|---|---|
| 482,670 | Ackerman | Sept. 13, 1892 |
| 1,829,232 | Morehouse | Oct. 27, 1931 |
| 2,588,300 | Smith | Mar. 4, 1952 |
| 2,719,378 | Salm | Oct. 4, 1955 |

FOREIGN PATENTS

| | | |
|---|---|---|
| 45,093 | Germany | 1888 |
| 63,985 | Switzerland | 1813 |